R. H. HENEMIER.
GAUGE.
APPLICATION FILED NOV. 24, 1917.
1,411,727.    Patented Apr. 4, 1922.
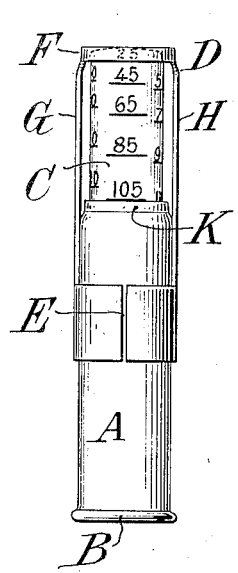
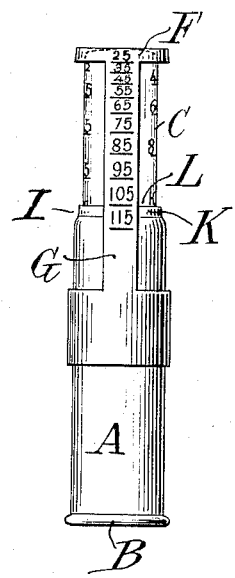
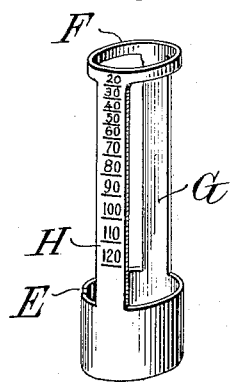
WITNESSES:
INVENTOR
Robert H. Henemier
By Attorneys,

UNITED STATES PATENT OFFICE.

ROBERT H. HENEMIER, OF NEW YORK, N. Y., ASSIGNOR TO A. SCHRADER'S SON, INCORPORATED, OF BROOKLYN, NEW YORK, A CORPORATION OF NEW YORK.

GAUGE.

1,411,727.          Specification of Letters Patent.          Patented Apr. 4, 1922.

Application filed November 24, 1917. Serial No. 203,668.

*To all whom it may concern:*

Be it known that I, ROBERT H. HENEMIER, a citizen of the United States of America, residing in the borough of Manhattan, city, county, and State of New York, have invented certain new and useful Improvements in Gauges, of which the following is a specification.

This invention relates to gauges, and aims to provide certain improvements therein.

The invention is particularly directed to tire pressure gauges of what is known as the pencil type, that is to say, gauges which are tubular in form and are adapted to be connected with the tire valve at one end. It is especially applicable to that class of pencil gauges wherein the indicating bar or sleeve is projected beyond the end of the gauge casing a varying distance to show varying pressures.

In pneumatic tire gauges the graduations are usually either indicated on the gauge bar or on the casing, and being in some form of printing or embossing require sufficient light to read them. The object of the present invention is to provide a construction in which the pressures can be ascertained in the dark. To this end I provide a member which is adapted to act in combination with the indicator, and which can be set to a predetermined point, so that the proximity of the indicator to such point can be ascertained by the sense of touch. The invention comprises other features of improvement which will be hereinafter described.

Referring to the drawings, which show the invention as applied to the well-known Schrader Universal type of pencil gauge—

Figure 1 is an elevation with the indicating member retracted, and the setting member in its folded or zero position.

Fig. 2 is a view at right angles to Fig. 1, showing the setting member extended, and the indicating sleeve projected from the casing.

Fig. 3 is an elevation at right angles to Fig. 2.

Fig. 4 is a perspective view of the setting member detached.

Referring to the drawings,—let A indicate the gauge casing, the lower end of which B is adapted to be connected with a pneumatic tire valve or the like, such end having means for making a tight joint with the tire valve, and means for opening the valve proper of the latter, whereby air flows up within the gauge and projects the indicating sleeve C from the upper end thereof to a point corresponding with the internal pressure of the tire. The indicating sleeve C is adapted to maintain its position after the gauge is removed from the tire valve until the sleeve is restored by hand. The internal construction of such gauges is well-known and need not be here described.

D is one form of the setting member provided by the present invention. In the preferred form shown it comprises a sleeve-like device having means for frictionally engaging the exterior of the gauge, such means being preferably provided by splitting the body of the setting member as shown at E. Preferably at the top there is an indexing element in the form of a ring F which is connected to the lower portion by arms G and H. Such arms are preferably of slight width in order that the usual gauge markings may not be obscured.

Preferably the arms G and H have scales marked on them which correspond to the scales on the indicating sleeve C. The top edge of the gauge casing indicated by the letter I serves as a pointer for both scales, and both scales have the same graduations so that when the setting member is adjusted to a given position the indicating sleeve will move to the same position under a corresponding pressure. In Fig. 3 of the drawing the setting member is adjusted to one hundred and five pounds, and when the indicating sleeve has been projected sufficiently to bring its extreme end to the same height as the end of the setting member, it will also show one hundred and five pounds' pressure.

The relative positions of the setting member and indicating sleeve are determined by placing the finger at the end of the setting member on the ring F, which serves as a guide or indexing element for determining the relative position of the indicating sleeve. It will therefore be apparent that the engagement between the indexing element and the casing should be of sufficient movement resisting character to prevent accidental or unintended displacement when applying the finger to take a reading.

The manner of use will be apparent. The setting member may be initially set to that pressure which the user requires for his particular tires, and may be left in such position. When it is desired to take pressures without the aid of sufficient light, the gauge is pressed on the tire valve and the sleeve C being adapted to maintain its position after removal from the tire valve, it is easy to ascertain whether the predetermined pressure has been reached solely by the sense of touch. If the end of the sleeve is below the top of the ring F, the tire obviously requires more inflation, and if it is above the ring the tire requires deflation. Preferably the device is constructed as shown so that the setting member may be completely retracted, in which position the upper edge of the ring F coincides with the upper edge I of the gauge casing. Customarily gauges of the type shown have a portion K of reduced diameter and the ring is preferably made of such dimensions as to fit this portion without extending above it. Such a folded or collapsed position is shown in Fig. 1, and when the parts are in such position the gauge may be used as has heretofore been customary without reference to the setting member.

After the pressure is taken and ascertained, the indicating sleeve C may be restored to its zero position by pressing it downward by the finger through the opening in the ring F. Instead of placing a scale on the setting member, it is obvious that this may be placed upon the gauge casing. The scale is not absolutely essential, since any position of the setting member may be determined by the indicating sleeve C; that is to say, the indicating sleeve may be moved outward by hand to a predetermined position and the setting member adjusted in accordance therewith.

In moving the sleeve C outward, the gauge casing may be grasped by the hand, and by a short, swinging motion, the sleeve may be thrown outward, so that it is accessible for adjustment.

It will be understood that while I have shown and described the preferred form of the invention, various changes may be made therein without departing from the spirit of the invention.

What I claim is:—

1. A pressure gauge comprising a body portion, an indicating element movable relatively to said body portion to positions designative of different pressures, and an indexing element carried by said body portion and settable in fixed relation therewith at different positions of adjustment clear of the path of movement of said indicating element and designative of different pressures within the range of registration of said indicating element, said indicating and indexing elements having parts adapted for a comparison of their relative positions by the application of the finger, whereby pressures registered by the indicating element relative to the pressure corresponding with the setting of said indexing element may be determined by the sense of touch.

2. A pressure gauge comprising a body portion, an indicating element movable relatively to said body portion to positions designative of different pressures, there being a gauge scale and indexing portion, one on said body portion, and one on said indicating element, from which the different pressures may be read, an indexing element carried by said body portion and settable in fixed relation therewith at different positions of adjustment clear of the path of movement of said indicating element and designative of different pressures within the range of registration of said indicating element, said indicating and indexing elements having parts adapted for a comparison of their relative positions by the application of the finger, whereby pressures registered by the indicating element relative to the pressure corresponding with the setting of said indexing element may be determined by the sense of touch, there being a setting scale and index, one on said body portion and the other on said indexing element, whereby said element may be set in accordance with any desired pressure, the markings on said setting scale corresponding with those of said gauge scale.

3. A pressure gauge comprising a casing, an indicating element normally housed within said casing but capable of being protruded therefrom to positions designative of different pressures, and an indexing element carried by said casing and settable in fixed relation therewith at different points of adjustment therealong designative of different pressures within the range of registration of said indicating element, said indexing element being clear of the path of movement of said indicating element and said indicating and indexing elements having parts adapted for a comparison of their relative positions by the application of the finger, whereby the pressure registered by said indicating element relative to the pressure corresponding to the setting of said indexing element may be determined by the sense of touch.

4. A pressure gauge comprising a casing, an indicating element normally housed within said casing but capable of being protruded therefrom to positions designative of different pressures and maintained in such positions on removal of the gauge from the influence of the pressure by which it is moved, and an indexing element carried by said casing and settable in fixed relation therewith at different points of adjustment along the path of movement of said indicating element designative of different pressures within its range of registration, said indexing element being clear of the path of movement of said indicating element and said indicating and indexing elements having parts adapted for a comparison of their relative positions by the application of the finger, whereby the pressure registered by said indicating element relative to the pressure corresponding to the setting of said indexing element may be determined by the sense of touch.

5. A variably settable indexing device for a pressure gauge of the type having a casing and an indicating element normally housed thereby but adapted to be protruded therefrom to positions designative of different pressures, said indexing device comprising a structure having means adapted to firmly engage the exterior of the gauge casing at any one of a number of different positions corresponding with different pressures within the range of registration of said gauge, and also having an indexing portion adapted to assume a position contiguous to the indicating member of the gauge but clear of its path of movement, thereby adapting it for use as a means of determining a registered pressure by the sense of touch.

6. A variably settable indexing device for a pressure gauge of the type having a casing and an indicating element normally housed thereby but adapted to be protruded therefrom to positions designative of different pressures, said indexing device comprising a structure having means adapted to firmly engage the exterior of the gauge casing at any one of a number of different positions corresponding with different pressures within the range of registration of said gauge, scale markings along said indexing device corresponding with those of the scale of the gauge on which the indexing device is to be used, and an indexing portion so located with respect to the casing engaging portion as to be adapted to assume a position contiguous to the indicating member of the gauge but clear of its path of movement, thereby adapting it for use as a means of determining a registered pressure by the sense of touch.

7. A setting member for tubular air pressure gauges comprising a tubular structure, having means adapted to adjustably engage the exterior of the gauge casing, and an indexing portion adapted to assume positions contiguous to the indicating member of the gauge, said setting member lying outside of the path of movement of the indicating member, whereby the movements of the latter do not affect the position of the setting member.

8. A setting member for tubular air pressure gauges comprising a tubular structure, having means adapted to adjustably engage the exterior of the gauge casing, and an indexing portion adapted to assume positions contiguous to the indicating member of the gauge, said setting member lying outside of the path of movement of the indicating member, whereby the movements of the latter do not affect the position of the setting member, and said engaging means comprising frictional means arranged at the lower part of the setting member.

9. A setting member for tubular air pressure gauges comprising a tubular structure, having means adapted to adjustably engage the exterior of the gauge casing, and an indexing portion adapted to assume positions contiguous to the indicating member of the gauge, said setting member lying outside of the path of movement of the indicating member, whereby the movements of the latter do not affect the position of the setting member, and said setting member having a scale device to co-operate with a complementary part on the gauge casing to facilitate the setting of the member.

10. A tubular gauge having a casing, and an indicating member projecting beyond the casing when registering; a tubular setting member, adjustably engaging the exterior of the casing, said setting member having an upper guide ring located beyond the casing when set for operation, and said setting member lying outside of the path of movement of the indicating member so that the indicating member can move past the guide ring, and said setting member having its lower engaging part connected to said upper guide ring by arms.

In witness whereof, I have hereunto signed my name.

ROBERT H. HENEMIER.